United States Patent

Bowen et al.

3,900,043

Aug. 19, 1975

[54] HYDRODYNAMIC DRAG REDUCTION DISPENSER-METERING SYSTEM

[75] Inventors: James Harold Bowen, Somerville, N.J.; Kenneth John Sollman, Yorktown Heights, N.Y.

[73] Assignee: Union Carbide Corporation, New York, N.Y.

[22] Filed: July 16, 1973

[21] Appl. No.: 379,706

Related U.S. Application Data

[63] Continuation of Ser. No. 151,374, June 9, 1971 abandoned.

[52] U.S. Cl. ............ 137/101.21; 137/604; 137/236
[51] Int. Cl. ............................................. F16k 19/00
[58] Field of Search .......... 137/3, 7, 9, 101.21, 604, 137/487.5, 101.11, 101.19, 239, 248, 565, 605, 98

[56] References Cited
UNITED STATES PATENTS

| | | | |
|---|---|---|---|
| 2,363,622 | 11/1944 | Rice................................... | 137/98 X |
| 2,594,476 | 4/1952 | Miller................................ | 137/605 X |
| 3,180,350 | 4/1965 | Rill, Jr. et al...................... | 137/240 |
| 3,219,273 | 11/1965 | Killen................................ | 137/240 X |
| 3,259,141 | 7/1966 | Brendon............................. | 137/3 |
| 3,361,161 | 1/1968 | Schwartz........................... | 137/525.1 X |
| 3,454,027 | 7/1969 | Friedman, Jr..................... | 137/101.21 |
| 3,481,350 | 12/1969 | Chamberlain..................... | 137/3 |
| 3,506,460 | 4/1970 | Bayne................................ | 137/101.19 X |

*Primary Examiner*—William R. Cline
*Attorney, Agent, or Firm*—J. H. Evans

[57] ABSTRACT

A hydrodynamic drag reduction dispenser metering system for a controlled aqueous stream which has in combination, a dispensing tank for containing and dispensing a liquid vehicle containing a friction reduction agent and prolelling means associated with the dispensing tank for propelling varying amounts of liquid vehicle. A conduit is provided for communicating the controlled aqueous stream and propelling means for delivering the liquid medium from the dispensing tank to the controlled aqueous stream. Gel controlling means are disposed on the conduit for controlling gel formation in the conduit when the system is not in operation and gel removing means are disclosed for removing gel formation in the conduit.

5 Claims, 9 Drawing Figures

INVENTORS
JAMES H. BOWEN
KENNETH J. SOLLMAN
ATTORNEY

HYDRODYNAMIC DRAG REDUCTION DISPENSER-METERING SYSTEM

This is a continuation of application Ser. No. 151,374 filed June 9, 1971, now abandoned.

This invention relates to hydrodynamic drag reduction dispenser-metering systems and more particularly to a poly(ethylene oxide) dispenser-metering system adapted for injecting poly(ethylene oxide) slurry into water streams.

The term "drag reduction", as it is known in the art, is the increase in the volumetric flow rate of a fluid, such as water, at a constant pressure drop due to the addition, usually of a small amount, e.g., a couple of hundred ppm or less, of a solid linear, polymeric material of relatively high molecular weight. Such material is known as the "drag reduction agent."

In recent years, considerable interest has been shown in the phenomenon of drag reduction in water under turbulent flow conditions caused by the addition of certain water soluble polymers. Merely as illustrative, it has recently been demonstrated that the discharge rate of fire hoses can be substantially increased by introducing a drag reducing agent into the flowing stream of water.

At present, the most effective drag reducing agents are the poly(ethylene oxide) resins, probably because their molecules have no side chains and therefore, are very long for a given weight. For example, high molecular weight poly(ethylene oxide) resins are about four times as effective as an equal weight of polyacrylamide. In addition, they are usually the most economical drag-reducing polymer.

Normally, the drag-reducing agents are employed in the form of an aqueous solution or currently and more preferably as a "slurry" or "dispersion". The aqueous solution technique presents operating problems due to viscosity limitations, large storage capacity requirements, susceptibility of the active polymer to undergo mechanical shear and susceptibility of the active polymer to oxidative degradation.

In view of the disadvantages inherent in the aqueous solution technique, the so-called "slurry" or "dispersion" approach was very recently developed. This approach has met with partial success. It involves suspending, at least temporarily, the polymeric drag reducing agent in an organic vehicle in order to obtain a formulation having a more concentrated form of the drag reducing agent. The slurry of dispersion approach offered systems in which mechanical shear susceptibility as well as oxidative degradation of the polymeric drag reducing agent was lessened.

When a drag reducing agent is to be added continuously to a fast, turbulent stream, such as a pipe or hose stream (water), it is usually added through a system or apparatus adapted to inject a slurry containing the drag reducing agent into the flowing stream at such a rate as to achieve an effecitve dosage of about 50 ppm. The slurry is introduced into the water stream via a pipe or conduit which is associated with a driving force, such as a pump, which in turn is associated with a storage dispenser containing slurry. At poly(ethylene oxide)-water concentrations of relatively equal proportions, a glutinous gel is formed. Unfortunately, the existence of this condition in the slurry pipe or conduit at the point of injection causes severe operating problems. Stated another way, the interaction of water and the slurry containing the friction reduction agent, mainly due to counter-current flow in the slurry pipe or conduit, causes gel formations for unpredictable lengths into the slurry pipe. The gel is glutinous in nature, forming a blocking in the slurry pipe which at times cannot be driven out by the slurry pump.

It is, therefore, an object of the present invention to provide a novel hydrodynamic drag reduction dispenser-metering system.

Another object is to provide a poly(ethylene oxide) dispenser-meter system adapted for injecting poly(ethylene oxide) slurries into water streams.

Another object is to provide a novel poly(ethylene oxide) dispenser-metering system, in which formation of glutinous gels in the system is limited.

These and other objects and advantages of the present invention will become more readily apparent from a consideration of the following specification when read in connection with the accompanying drawings in which:

FIGS. 2A and 2B are views taken along the lines 1—1 of FIG. 1 showing an apparatus for controlling the extent of gel formation in the conduit wherein FIG. 2A shows the apparatus in the operate position and FIG. 2B shows the apparatus in the closed position.

Figure 2A:
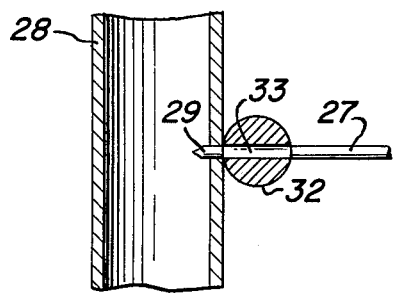
Figure 2B:
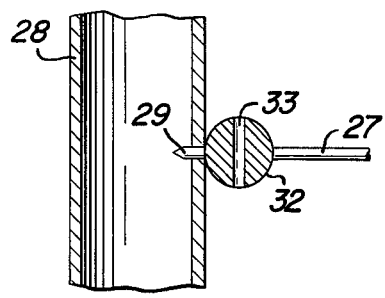
Figure 3A:
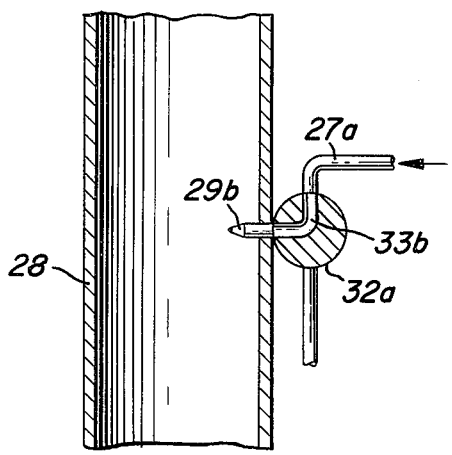
Figure 3B:
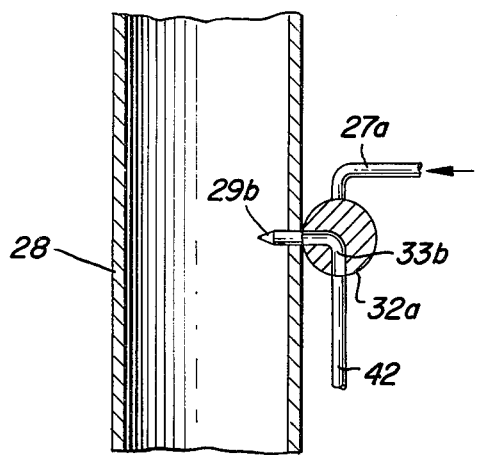
Figure 3C:
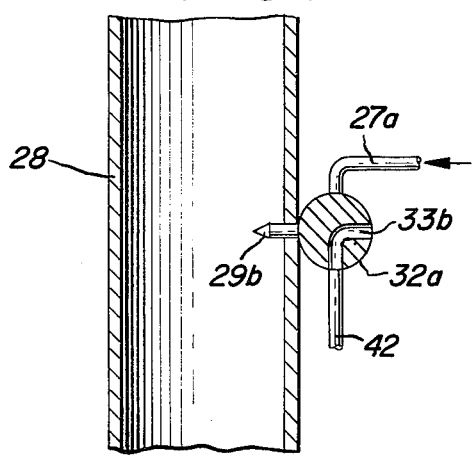

FIGS. 3A, 3B, and 3C are views similar to FIG. 2 showing another embodiment of the apparatus for controlling the extent of gel formation in the conduit, shown in three positions, i.e., FIG. 3A, operative, FIG. 3B, flush and FIG. 3C, closed position.

Figure 1:
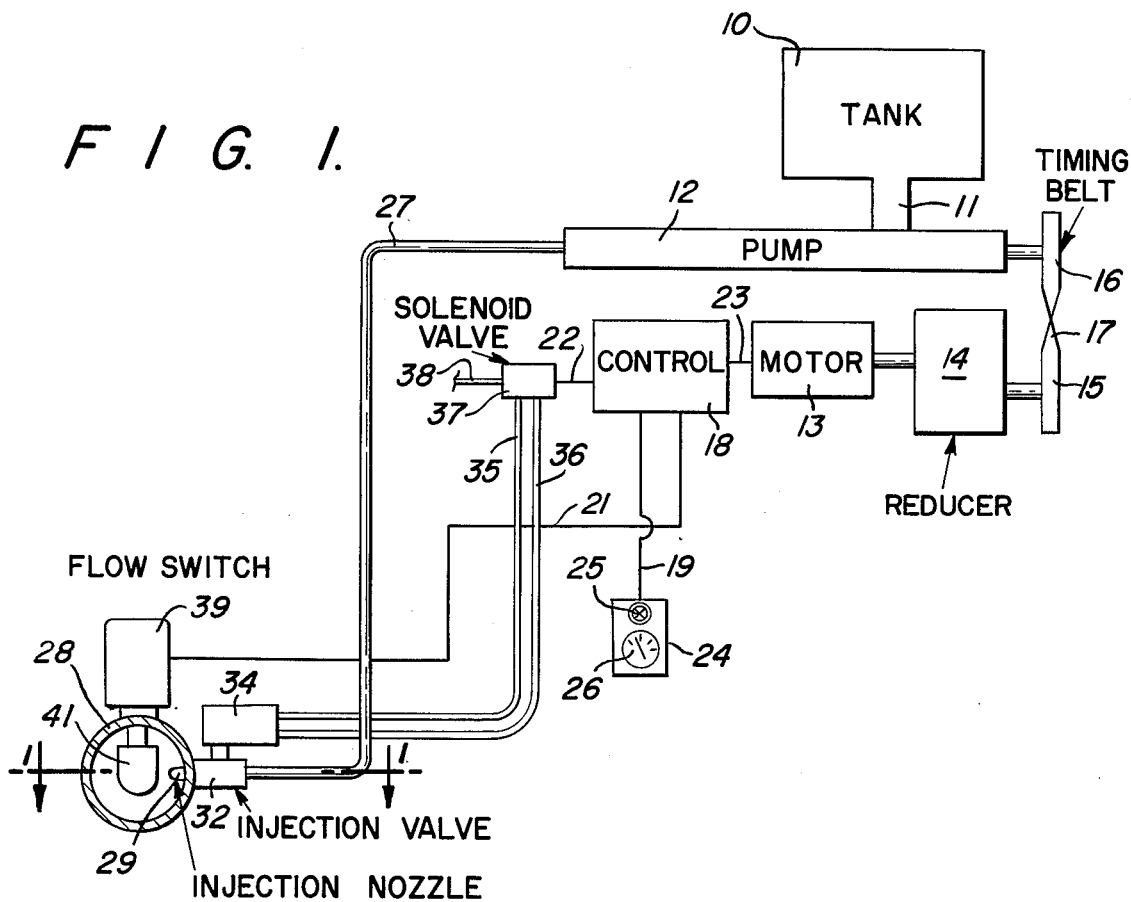
FIG. 1 is a schematic view of the dispenser-metering system.
Figure 4A:
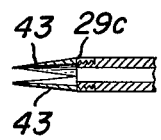
Figure 4:
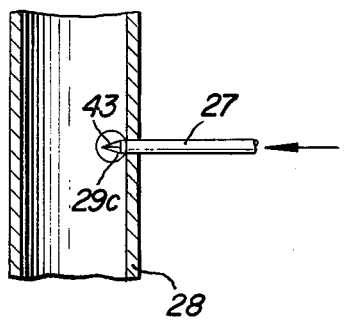

FIG. 4 is a plan view taken along the broken line 1—1 showing another embodiment of the apparatus for controlling the extent of gel formation in the conduit wherein the injection valve shown in FIG. 1 is excluded.

Figure 4B:
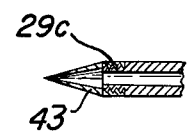

FIGS. 4A and 4B are exploded views of the end of the conduit shown in FIG. 4 showing the injection nozzle in the open and closed position.

Proceeding now to a more detailed description of the invention, and with particular reference to FIG. 1, the hydrodynamic drag reduction dispenser metering system includes a dispensing tank 10 which is adapted to contain and dispense a friction reduction agent, preferably poly(ethylene oxide), in a liquid vehicle, desirably an organic vehicle such as isopropanol. For purposes of convenience, the friction reduction agent and the liquid vehicle will hereafter be referred to as slurry. The tank 10, having a discharge outlet 11, is desirably equipped with means for maintaining the temperature within the operating ranges best suited for the particular operation.

Propelling means are associated with tank 10 which as shown in FIG. 1, is a pump 12. It will of course be understood that other propelling means which are well known in the art, can be employed for transporting the slurry from tank 10 to the aqueous stream to be treated. For controlled slurry metering, the pump 12, indicated in FIG. 1 is basically any type of positive displacement pump such as a screw type, gear type, lobe or sliding vane type pump. The pump can be driven at various rates of speed depending on the amount of slurry to be added to the aqueous stream, which aqueous stream can in turn service one or more outlets such as, one or more fire hoses associated with the main aqueous stream.

In FIG. 1 there is also illustrated one of a number of possible methods for varying the speed of pump 12. Thus, as shown in FIG. 1, a variable speed electric motor 13, is electrically associated with reducer 14, which communicates with pump 12 via a pulley arrangement containing pulley wheels 15 and 16 which in turn accommodates a timing belt 17. Thus, electric motor 13 and pump 12 are "coupled together" by two stages of mechanical speed reduction.

Electric motor 13, is electrically responsive to control box 18 containing terminals for circuits 19, 21, 22 and 23. Circuit 19 originates from switch box 24 which is energized by on-off button 25. Switch box 24 also includes dial 26 which has various settings for varying the speed of pump 12. Thus, initially, by merely appropriately positioning dial 26, the operator can select the proper pump speed, which in turn is dependent upon the calculated slurry requirements.

The slurry leaves pump 12 through conduit 27 which can be a pipe of tube, ultimately leading to pipe 28 through which the aqueous stream passes under pressure from a water source, (not shown). Therefore for purposes of this invention the pressure driven aqueous stream is termed a "controlled aqueous stream". Situated near the end of conduit 27, i.e., the end closest to the controlled aqueous stream, are gel controlling means which control the extend of gel formation as will be later explained, and which also serves to inject or release the slurry from conduit 27 into pipe 28 via injection nozzle 29.

It has been observed that fouling due to gel formation occurs when slurry is not being pumped into the controlled aqueous stream. The interaction of water and slurry, mainly due to counter-current flow in injection nozzle 29 and conduit 27 causes gel formation for unpredictable lengths in conduit 27. The gel is glutinous in nature, forming a blockage in conduit 27 which at times cannot be driven out by pump 12. For this reason, the gel controlling means are provided for controlling the extent of gel formation in conduit 27. As will be explained hereafter, the gel controlling means can be either a general type of injection nozzle working in combination with valve means, or alternatively a specific type of injection nozzle which does not require valve means associated therewith.

Referring to FIGS. 2A and 2B, there is illustrated one method for controlling the extent of the gel formation which method utilizes a valve 32 containing a passage 33 communicating with injection nozzle 29 and conduit 27 when the system is in operation. During operation of the system, as shown in FIG. 2A, the slurry passes from conduit 27 through passage 33 and thence through nozzle 29 into the controlled aqueous stream flowing through pipe 28. When the system it not in operation, as shown in FIG. 2B, the injection valve 32 is rotated so that passage 33 no longer communicates with conduit 27 or injection nozzle 29. Thus, any gellation which takes place can only be in the injection nozzle 29. However, this gelled material can be removed during subsequent operation when passage 33 is again aligned with conduit 27 and nozzle 29 by virtue of the pressure exerted by pump 12, on the slurry leaving tank 10.

Injection valve 32, can be any type of conventional valve suitable for the intended purpose and preferably of the "ball valve" type. There are numerous types of commercially available valves which are adapted to permit the passage of slurry from conduit 27 to injection nozzle 29 during operation and visa versa, to prevent the flow therethrough. These type valves can be "air-operated" so as to regulate the position of the passage in the valve by means of air pressure operating for example, on a lever associated with the valve, and which is capable of rotating the valve passage either one quarter, one half, or three quarter turn, depending on the results to be achieved. Thus injection valve 32 can be controlled by means of air valve 34 which by means of a source of air acting on a lever (not shown) can consequently control the position of passage 33. The air valve 34, receives the source of air from air ducts 35 or 36.

When air flows through air duct 35, the valve is rotated to the "operate position" as shown in FIG. 2A whereas when air flows through air duct 36, the valve is rotated to the closed position as shown in FIG. 2B. The air flow is regulated by solenoid 37, i.e., whether air from air duct 38 is directed to air duct 35 or 36 depends upon solenoid 37. Referring again to FIG. 1, it will be seen that solenoid 37 is activated or deactivated by control 18 via circuit 22. The position of injection valve 32, i.e., whether in the operative position as shown in FIG. 2A or closed position as shown in FIG. 2B depends of course upon whether an aqueous stream is flowing through pipe 28. Referring again to FIG. 1, it will be seen that the flow of aqueous stream can be detected by means of flow switch 39 which is responsive to the action of plate 41 situated in pipe 28. Plate 41 is normally vertically disposed when the aqueous stream is not flowing. However, during flow, the plate is urged in the direction of water flow, and contact is made with control 18 via circuit 21. Solenoid valve 37 responds to activation of control 18 via circuit 22 and permits air to enter air duct 35 thereby activating injection valve 32 and described previously. Motor 13 also responds through circuit 21 and causes activation of pump 12 which forces slurry through conduit 27 and into pipe 28.

It will be evident, in this type operation, that any gel formed in injection nozzle 29 from previous operation is removed by the differential in pressure in conduit 27 and pipe 28.

FIGS. 3A, 3B and 3C show another embodiment of means for controlling the extent of gel formation in conduit 27. As will be seen in FIG. 3A, in the operate position, the passage 33b is disposed substantially at right angles and communicates with conduit 27a and injection nozzle 29b. In the flush position, as shown in FIG. 3B, the valve is rotated so that the portion of passage 33b previously in contact with conduit 27a now aligns with and contacts the injection nozzle 29b. Thus, slurry is prevented from entering conduit 27a whereas any material remaining in injection nozzle 29b is flushed out through vent 42 by the pressure differential in the aqueous stream in pipe 28 and the atmosphere. In a third or closed position as shown in FIG. 3C, the valve is again rotated so that passage 33b is in an out-of-contact relation with conduit 27a and injection nozzle 29b. It will be obvious that utilization of this type device requires slight modification of the system shown in FIG. 1 in that conduit 27a would have to conform to substantially the configuration shown in FIGS. 3A, 3B and 3C. In addition, a vent 42 is provided for accommodating the flushed material. The injection valve 32A, also of a conventional type and readily available to those in the art. In addition, a slight modification of the monitoring system for the injection valve 32a is required in order to be in the positions shown in FIGS. 3A, 3B and 3C. These modifications, however, are slight in nature and include appropriate positioning of switches, circuitry, etc., which can be readily accomplished by those skilled in the art.

A further embodiment of means for controlling the extent of gel formation in conduit 27 is illustrated in FIG. 4. As will be noted, the device is relatively simple and easily attached to the end of the conduit 27 such as by threaded engagement, etc. The injection nozzle 29c has end lips 43 which are normally urged towards a central axis, but of sufficient resiliency so as to yield away from the central axis under the influence of pressure. Thus, when the system is not in operation, the end lips 43 are in substantial contact thereby preventing water from entering conduit 27 to any appreciable extent. During operation, the pressure exerted by pump 12 which drives the slurry through conduit 27 causes the end lips 43 to be deflected away from the central axis and any accumulated gelled material is driven back into pipe 28 by the differential in pressure in the conduit 27 and pipe 28. It will be evident that when employing this type device for controlling the extent of gel formation, that there is no need for the injection valve or air supply system shown in FIG. 1.

In a representative technique of operation with reference to FIG. 1, the operator selects the appropriate slurry feed rate by moving dial 24 to the appropriate setting, and thereafter the operator activates the system by pushing the on-off switch 25. When the aqueous stream in pipe 28 passes slate 41 of the flow switch 39, the plate is deflected in the path of the stream thereby activating control 18 and motor 13 via circuits 21 and 23. The pump 12 is activated and drives the slurry from tank 10 through conduit 27 and into injection valve 32. The injection valve 32 is at this time in the operate position in response to the action of the flow switch 39 which activates the solenoid 37 permitting air to pass through air duct 35 thereby rotating injection valve 32 to the appropriate position.

Any gelled slurry remaining in injection nozzle 29 from previous operation, will pass into the aqueous stream due to the pressure exerted by pump 12 on the slurry in conduit 27. When the aqueous stream no longer flows through pipe 28, the flow switch 39 is deactivated by paddle 41 thereby terminating the action of pump 12. At this time, control 18 via circuit 21, deactivates solenoid 37. As a result the injection valve 32 is rotated to flush or closed position depending on the type injection device utilized. The extent of gel formation in the conduit will be controlled as described previously, and any accumulated gel can be easily removed by either the pressure exerted by the water stream or alternatively by the pressure exerted by pump 12, the applicable method of course depending on the type of device employed as previously described.

From the foregoing description of the component elements making up this invention, it will readily be seen that the operating difficulties inherent to the application of slurries containing a hydrodynamic drag reducing agent have been eliminated. The hydrodynamic drag reduction dispenser metering system described, is easily installed and serviced due to the lack of gelled slurry in the system which would otherwise clog or foul up the system.

While particular embodiments of this invention have been described and shown, it will of course, be understood that this invention would not be limited thereto since many modifications may be made and all such modifications are within the true spirit and scope of this invention.

What is claimed is:

1. A hydrodynamic drag reduction dispenser metering system for injecting a slurry of a friction reduction agent in a liquid vehicle into a controlled aqueous stream comprising in combination, a dispensing tank for containing and dispensing said slurry, a positive displacement pump associated with said dispensing tank for propelling varying amounts of said slurry, an injection valve attached contiguously to an injection nozzle in contact with said controlled aqueous stream, conduit means communicating with said injection valve and said pump for delivering said slurry from said dispensing tank to said controlled aqueous stream through said injection valve and nozzle, said injection valve being responsive to a positive flow of said controlled aqueous stream through being adapted to close when said positive flow ceases, said injection valve being adapted to provide when required a temporary purge passage from said nozzle to the atmosphere for cleaning gel from said nozzle by back pressure from said controlled aqueous stream.

2. A system according to claim 1 wherein said conduit means includes a pipe or tube.

3. A system according to claim 1 wherein said injection valve is responsive to the same control means as said pump.

4. A system according to claim 1 wherein said injection nozzle has end lips which are normally closed on a central axis, but are of sufficient resiliency to open by yielding away from said central axis under the influence of pressure from said slurry.

5. A system according to claim 1 wherein said injection valve is further adapted to position when required the passage through said injection valve body so that it is open to the atmosphere at both ends so as to permit the purging therefrom of any gel formed therein.

* * * * *